United States Patent [19]

Mickowski et al.

[11] 3,858,009

[45] Dec. 31, 1974

[54] ELECTRONIC AUTOMATIC DIALING APPARATUS

[75] Inventors: John Mickowski, Maplewood, N.J.; Ronald G. Caravello, Massapequa, N.Y.

[73] Assignee: Porta Systems Corp., Roslyn, N.Y.

[22] Filed: Apr. 13, 1973

[21] Appl. No.: 350,903

[52] U.S. Cl. .............................................. 179/90 BD

[51] Int. Cl. .............................................. H04n 1/42

[58] Field of Search........... 179/90 B, 90 BD, 90 CS

[56] References Cited

UNITED STATES PATENTS

| | | | |
|---|---|---|---|
| 3,301,967 | 1/1967 | Plyer | 179/90 BD |
| 3,515,815 | 6/1970 | Baynard | 179/90 B |
| 3,692,962 | 9/1972 | Raczynski et al. | 179/90 B |
| 3,718,771 | 2/1973 | Bank | 179/90 B |

*Primary Examiner*—Kathleen H. Claffy
*Assistant Examiner*—Gerald L. Brigance
*Attorney, Agent, or Firm*—Philip D. Amins

[57] ABSTRACT

Automated electronic dialer apparatus includes a three section wire-programmable connection matrix field for loading and determining an equipment or telephone directory number to be dialed, and for establishing the desired number of digits for the outgoing number. Counter-decoder apparatus signals to the connection field cumulative dial pulse (per digit) and digit-being-dialed information, control structure being provided to automatically clear the pulse counter and advance the digit counter after issuing the proper number of dial pulses for each digit.

In accordance with additional aspects of the present invention, automatic power shut down, and circuit-initialization upon power turn-on, is implemented.

11 Claims, 2 Drawing Figures

PATENTED DEC 31 1974

3,858,009

SHEET 2 OF 2

ELECTRONIC AUTOMATIC DIALING APPARATUS

This invention relates to electronic telephony apparatus and, more specifically, to an electronic programmable automatic dialer.

It is an object of the present invention to provide improved automatic dialer apparatus.

More specifically, it is an object of the present invention to provide an automatic dialer which is wire, plugboard programmable; which may accommodate directory numbers of varying numbers of digits; which consumes substantial power only when in an active dialing mode; and which may be readily constructed.

The above and other objects of the present invention are realized in a specific, illustrative automatic dialer which includes a dial pulse oscillator, and a dial pulse counter-decoder for providing dial pulse information to a wire programmable three section cross connection matrix field. Also supplied to the connection field is the output of a digit counter-decoder signaling the particular digit of the desired telephone number to which the outgoing dial pulses correspond.

Control apparatus is provided to terminate dial pulsing for a digit when the proper number of pulses-established by a specific matrix cross connection-have issued. The apparatus then automatically progresses to the next digit until the called number is completed.

In accordance with additional aspects of the invention, power is substantially shut down after dialing is completed to conserve battery energy and life, and system initialization is provided to assure start up of the dialing electronics in a known and prescribed state.

The above and other features and advantages of the present invention will become more clear from the following detailed description of a specific illustrative embodiment thereof, presented hereinbelow in conjunction with the accompanying drawing, in which FIGS. 1A and 1B respectively depict the left and right portions of specific illustrative automatic dialer apparatus.

Figure 1A:
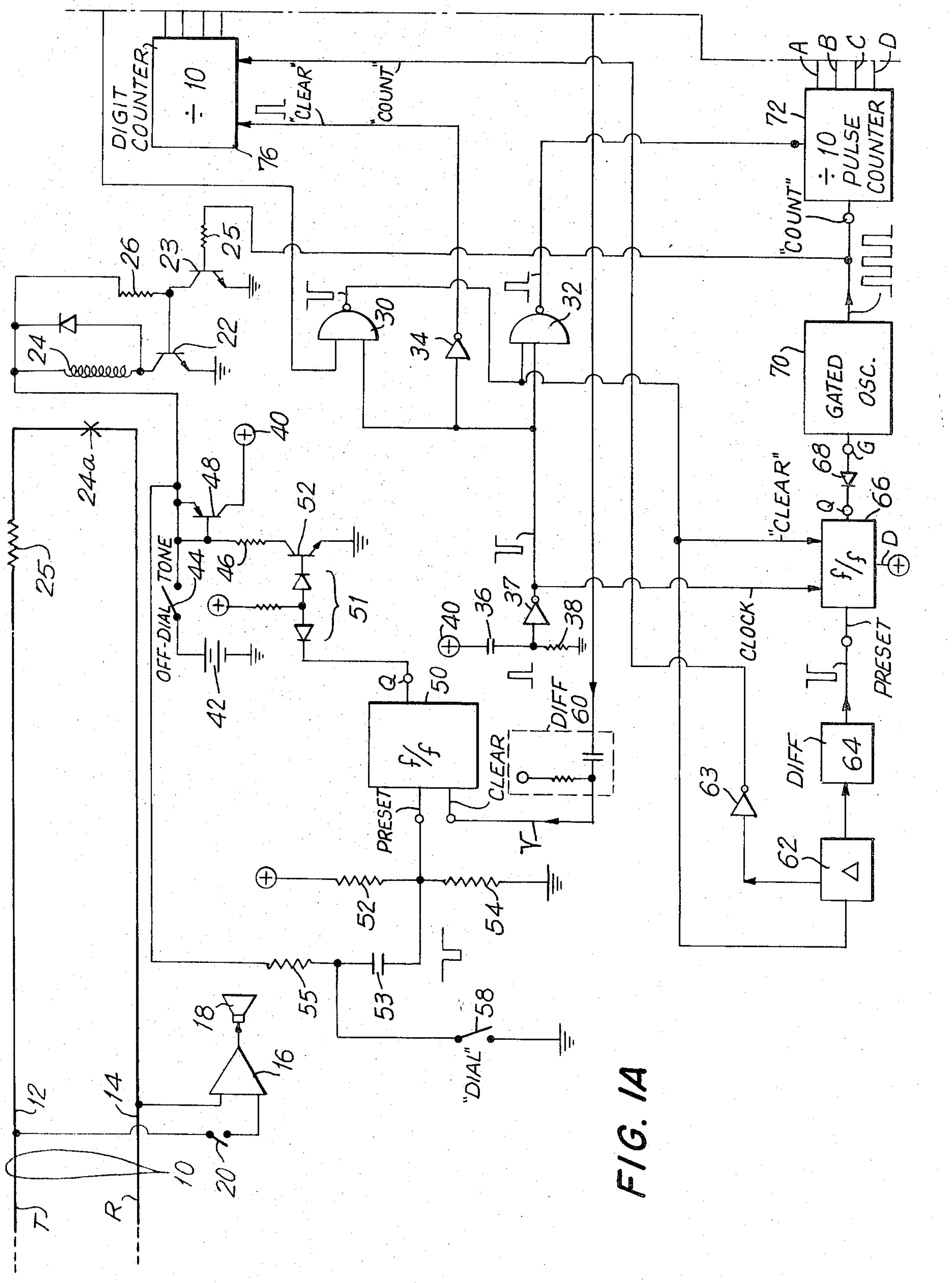
Figure 1B:
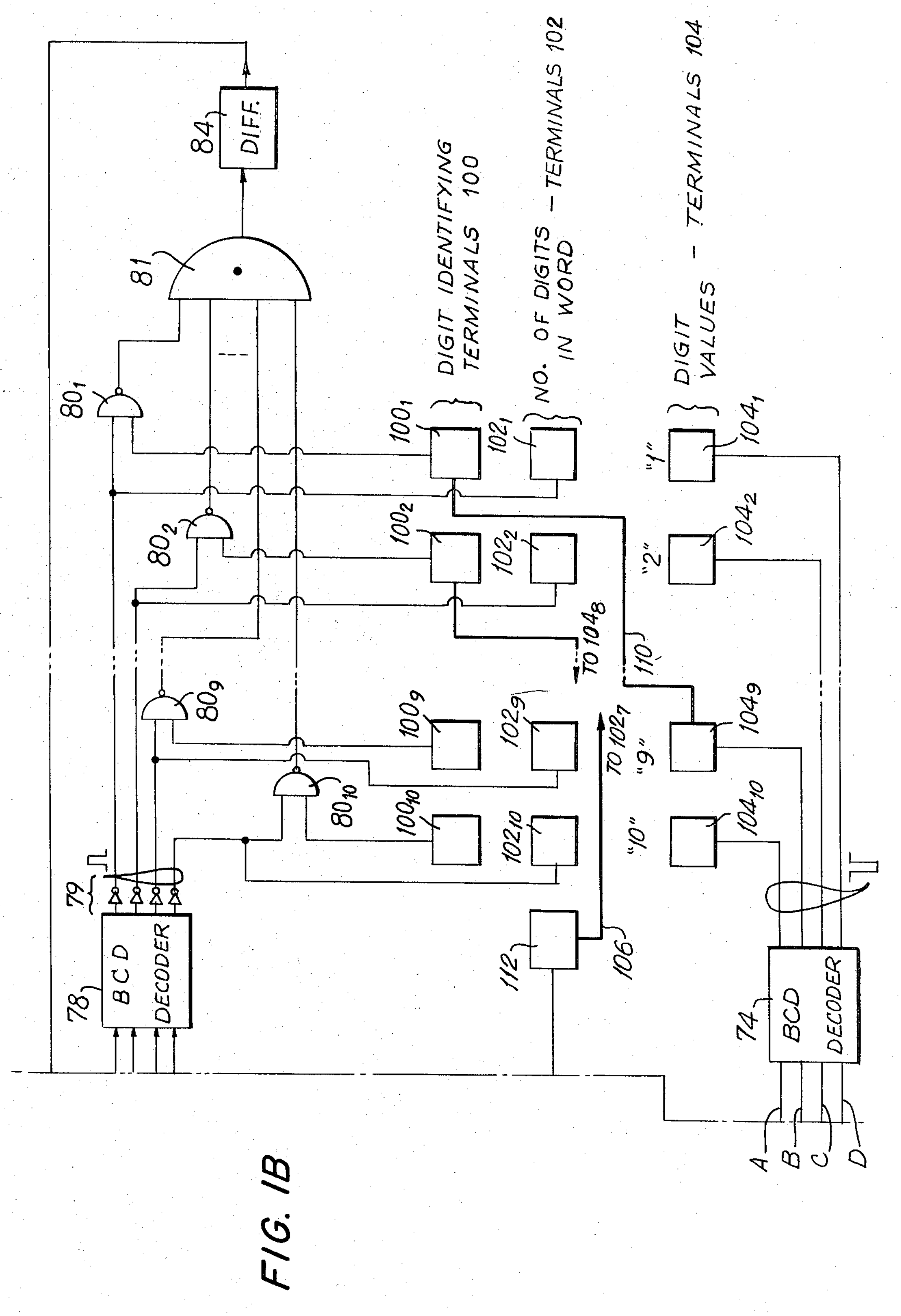

Referring now to FIGS. 1A and 1B, hereinafter referred to as composite FIG. 1, there is shown automatic dialing apparatus for selectively dialing a telephone equipment number via tip and ring conductors 12 and 14 of a subscriber cable pair or central office trunk 10. Prior to effecting any dialing operation, an operator of the FIG. 1 apparatus closes a switch 20 to bridge the inputs of an amplifier 16 across the tip and ring conductors, the amplifier driving a loudspeaker 18. The operator listens to the output of loudspeaker 18 to verify that the tip and ring conductors 12 and 14 are not already in service, and thus that a dialing mode of operation will not interfere with existing service obtaining on the cable pair or trunk 10.

Assuming that the monitor amplifier 16 and speaker 18 verify that the conductors 10 are available, an "off-dial tone" switch 44 is closed to connect a battery 42 to select FIG. 1 automatic dialer circuitry. In particular, energy from the battery 42 is applied via a resistor 26 into the base of a transistor 22 to saturate the device 22, effectively connecting battery potential across the coil 24 of a relay. The energized relay closes normally open relay contacts **24-*a*, hence bridging a resistor 25 of relatively low impedance, e.g., 600 ohms, across the tip and ring conductors 12 and 14. This low resistance across the tip and ring conductors signals an off-hook condition to the central office control equipment which thus issues dial tone to the line or trunk 10. Incidence of such dial tone may again be verified by the amplifier-speaker 16–18. It is observed that the collectoremitter junction of a transistor 23 shunting the base-emitter junction of the transistor 22** is normally non-conductive at this time.

Once dial tone is verified, the operator closes a "dial" switch 58 to automatically generate a complete dial pulsing sequence of operation to issue that pattern of dial pulsing which will access and seize the cable pair of a particular central office subscriber, or a particular trunk or other called entity. The identity of the called equipment is determined by the wire interconnection pattern between a first plurality of terminals 100 and a second plurality of terminals 104. More specifically, a first terminal $\mathbf{100_1}$ of the array 100 is associated with the first digit of a called number, and is connected to a terminal $\mathbf{104_i}$ of the array 104 to dial the number *i* as a first digit. Correspondingly, the other terminals $\mathbf{100_j}$ are connected to one of the terminals $\mathbf{104_k}$ to dial the number *k* as the *j*-th digit of the called number. For example, to dial a number 986-2480, connections are established between the terminals $\mathbf{100_1}$–$\mathbf{104_9}$; $\mathbf{100_2}$–$\mathbf{104_8}$; $\mathbf{100_3}$–$\mathbf{104_6}$; $\mathbf{100_4}$–$\mathbf{104_2}$; $\mathbf{100_5}$–$\mathbf{104_4}$; $\mathbf{100_6}$–$\mathbf{104_8}$; and $\mathbf{100_7}$–$\mathbf{104_{10}}$. The terminals $\mathbf{100_8}$–$\mathbf{100_{10}}$ are not used, these being available if another three digits are required to identify the called party as for an area code. Correspondingly, if dialing is to be done within the confines of the central office, four digits may suffice.

To institute a dialing pulse mode of operation, the "dial" switch 58 is momentarily closed to pull to ground the junction of a resistor 55 and a capacitor 53, thereby also providing a negative pulse at the preset input terminal of a flip-flop 50. This forces the Q output of the flip-flop 50 to be a relatively high voltage condition, latching on a transistor 52 via a diode gate 51. The resulting low collector voltage of the conducting transistor 52 forward biases a PNP transistor 48 which supplies a positive voltage to a bus 40 which furnishes power to the remaining electronic elements of the composite FIG. 1 arrangement.

By way of circuit initialization, when power first appears on the internal power supply bus 40, a differentiator 36-38 provides a positive pulse which is inverted to a negative pulse at the output of an inverter 37. The negative pulse is employed to set a flip-flop 66 (high Q output terminal) to turn on a gated oscillator 70 which selectively provides an output square wave at the 10 Hz dial pulse rate. The negative going pulse provided by the inverter 37 on power turn on also provides a positive output at a NAND gate 32 to clear a dial pulse counter 72, and to clear a digit counter 10 by a positive pulse acting through an inverter 34. With the circuit initialized as above described at the inception of the active dialing mode of operation, the system arrangement of FIG. 1 now begins to generate dial pulsing for the first digit (e.g., a 9 for the assumed example).

In this regard, and pursuant to the called number identifying wire interconnection pattern considered above, note that the jumper 110 connects the terminals $\mathbf{100_1}$ and $\mathbf{104_9}$. The first pulse generated by the oscillator 70 is counted by the counter 72, the outputs of which are decoded by a binary coded decimal (BCD) to 1-of-*n* decoder 74. Each of the outputs of the decoder 74 are connected to a different one of the cross connection matrix field terminals $\mathbf{104_1}$–$\mathbf{104_{10}}$. As is well known to those skilled in the art, the output of a typical integrated circuit decoder provides high level output voltages on all output terminals except that one terminal corresponding to the decimal equivalent of the binary input digits supplied thereto. Thus, when a 1 is stored in the counter 72 after the first oscillator 70 pulse, the four output digits thereof assume the binary states 0001 and a low output voltage is supplied by the decoder 74 only to the terminal $\mathbf{104_1}$.

Correspondingly, the initialized 0000 state of the counter 76 is decoded by a BCD decoder 78 which supplies relatively low output voltage at only one of its output leads (assumed to be the upper one shown in the drawing). This voltage pattern output for the decoder 78 is inverted by plural inverters 79 such that a relatively high voltage is supplied at the output of only the top inverter during processing (dialing) of the first desired digit. This high voltage inverter output partially enables a NAND gate $\mathbf{80_1}$ associated with dialing of the first digit while all of the gates $\mathbf{80_2}$–$\mathbf{80_{10}}$ associated with dialing of subsequent digits are all blocked by low inverter-supplied inputs to reside in their high output voltage condition.

The second input for the gate $\mathbf{80_1}$ is connected to the terminal $\mathbf{100_1}$ and, by the dialed digit signifying jumper 110, connected to the terminal $\mathbf{104_9}$ which is at a relatively high state while a 1 (and not yet a 9) is stored in the dial pulse counting element 72. Accordingly, both inputs of the gate $\mathbf{80_1}$ are high providing a relatively low output voltage thereat thereby resulting in a relatively low output voltage at the output of an AND gate 81.

It is also observed that the first output pulse from the gated oscillator 70 is applied through a resistor 25 to saturate the transistor 23, thereby shunting the base drive normally supplied to the transistor 22 by resistor 26, turning transistor 22 off. This de-energizes the relay coil 24 such that the relay contacts 24-*a* open, thereby removing the low impedance 25 bridging the tip and ring conductors 12 and 14. This impedance transition directly comprises the first dial pulse for the first digit to be dialed.

When the output of the oscillator 70 returns to a low state during the next oscillation half cycle, the transistors 23 and 22 are respectively turned off and on, such that the contacts 24-*a* again close reconnecting the low impedance 25 across the tip and ring conductors.

The above mode of operation continues for each of the next series of dial pulses. In particular, each pulse advances the state of the counter 72 such that the relatively low output of the BCD decoder 74 shifts from the terminal $\mathbf{104_1}$ to the terminal $\mathbf{104_2}$ to the terminal $\mathbf{104_3}$, and so forth. Thus, for the first eight such pulses, a contact opening and closure for the relay element 24-*a* is effected producing the first 8 dial pulses of the desired first dialing number 9. For all such states of the counter 72 and decoder 74, the voltage supplied by the decoder 74 to the terminal $\mathbf{104_9}$ remains high, thus maintaining the output of the gates $\mathbf{80_1}$ and 81 low.

The ninth pulse generated by the gated oscillator 70 effects a cycle of operation for the relay contacts 24-a, as above described, to issue the 9th pulse in sequence. This pulse also advances the counter 72 to the ninth state 1001. The decoder 74 responds thereto by supplying a low potential to the terminal $\mathbf{104_9}$. This low potential changes the output of the NAND gate $\mathbf{80_1}$ to a high state, thereby also providing a positive going transition of the output of the AND gate 81. The positive transition is converted to a positive pulse by a differentiator 84 which supplies a positive pulse to the upper input of a NAND gate 30. The gate 30 also receives a high input potential from the output of the inverted 37 (for example, for conventional current sinking logic, the resistance of the element 38 may be sufficiently low—about 500 ohms or less—to quiescently provide a zero input for the inverter 37).

Accordingly, the positive output of the differentiator 84 generates a low pulse output for the NAND gate 30 which gives rise to several system functions. First, the negative output of the gate 30 clears the flip-flop 66 (resulting in a low Q output voltage) to disable the oscillator 70 via diode 68 to interrupt dial pulsing. Further, the negative output pulse from the gate 30 is inverted by the gate 32 to a positive pulse which clears the pulse counter 72 such that the counter 72 starts from its initial state when dialing for the next (second) digit is to be effective. Then, also, the pulse output of gate 30 is delayed via a delay element 62, inverted, and supplied as an input to the digit counter 76 such that the counter advances one state to partially enable the NAND gate $\mathbf{80_2}$ (only) via elements 78 and 79. The partially enabled NAND gate $\mathbf{80_2}$ effectively signals that the second digit will next be processed. Finally, a differentiator 64 differentiates the output of the gate 30 to again preset the flip-flop 66 (high Q output) to again gate on the oscillator 70.

Once the dial pulses are resumed by the high Q output of flip-flop 66, the circuitry of FIG. 1 performs in the manner above described to generate a sequence of dial pulses for the second digit. Thus, for the assumed second digit 8, eight pulses are generated until the 1000 output of counter 72 provides a low voltage to the terminal $\mathbf{104_8}$ to provide a low-to-high voltage transition at the outputs of the gates $\mathbf{80_2}$ and 81, as above described. The above mode of circuit functioning iteratively recurs until all digits in the called number have been dialed.

The connection terminal field comprises a third set of terminals $\mathbf{102_1}$ –$\mathbf{102_{10}}$ which are employed to signal to the system the number of digits contained in the number to be dialed, and thus to provide information signaling when dialing is completed. For the assumed dialed number consisting of seven digits, a jumper 106 is connected between a terminal $\mathbf{102_8}$ and an output terminal 112. Each of the terminals $\mathbf{102_i}$ is connected with the output of a BCD decoder and inverter 78 and $\mathbf{79_i}$ such that a positive level is supplied thereto when the *i*-th digit is being dialed. Again for the specific assumed seven digit number, the voltage supplied by the gate $\mathbf{79_7}$ returns to a low voltage state following completion of dialing thereof. This low voltage transition is detected by a differentiator 60 which clears the flip-flop 50, thereby providing a low voltage output at the Q terminal thereof. This low voltage output acts through the diode gate 51 to remove base drive from the transistor 52, thereby turning off the PNP transistor 48 and removing positive potential from the bus 40 which powers the system's integrated circuits. Accordingly, after desired dialing is completed, the apparatus of FIG. 1 is automatically turned off and issues no further dial pulses. Moreover, power is removed from the major portion of the electronic circuitry of FIG. 1 such that there is no needless battery drain. It is observed, however, that the conductors 10 remain seized since the relay 24 and relay actuating transistor 22 are energized directly by the battery 42. Accordingly, after completion of dialing, any desired or appropriate apparatus may be bridged across the tip and ring conductors 12 and 14 to perform desired testing and/or communicating. The seized line may be released by simply opening the switch 44.

The above-described arrangement is merely illustrative of the principles of the present invention. Numerous modifications and adaptations thereof will be readily apparent to those skilled in the art without departing from the spirit and scope of the present invention.

What is claimed is:

1. In combination in an automatic dialer apparatus, a gated dial pulse oscillator, a dial pulse counter for counting the output pulses of said oscillator, first state decoder means connected to said dial pulse counter, a digit counter, second state decoder means connected to the output of said digit counter, a wire programmable cross connection field comprising a first plurality of terminals connected to said first decoder means and a second plurality of terminals connected to said second decoder means and a third plurality of terminals for establishing a number of dialing digits to be effected by said automatic dialer apparatus, control means connected to said first and second terminal pluralities for selectively clearing said dial pulse counter and advancing said digit counter, bridging impedance means for signalling an off-hook condition, controlled switching means for bridging a tip and ring conductor pair with said bridging impedance means, and means responsive to the output of said gated oscillator for actuating said controlled switching means.

2. A combination as in claim 1, further comprising initializing means for initializing said digit counter and said dial pulse counter to a reference state upon application of power.

3. A combination as in claim 2, wherein said initializing means comprises a differentiator responsive to power turn on for generating a counter clearing pulse.

4. A combination as in claim 1, wherein said control means comprises a plurality of coincidence gates, each having first and second inputs, said second state decoder means having a plurality of outputs, the first input of each of said coincidence gates being connected to a different output of said second state decoder means, said second input of each of said coincidence means being connected to a different one of said plural second terminals.

5. A combination as in claim 4, further comprising additional coincidence means having plural inputs thereof connected to the outputs of said plural coincidence gates.

6. A combination as in claim 5, further comprising differentiator means responsive to a voltage transition at the output of said additional coincidence means for clearing said dial pulse counter and for advancing said digit counter.

7. A combination as in claim 6, further comprising means responsive to the output of said differentiator means for disabling said gated dial pulse oscillator.

8. A combination as in claim 7, further comprising delay means responsive to the output of said differentiator for enabling said gated oscillator.

9. A combination as in claim 1, further comprising monitor audio means adapted for connection to said tip and ring conductor pair for monitoring the status thereof.

10. A combination as in claim 1, wherein said third plurality of terminals is operative to signal the end of dialing, and further comprising gated power supply means, and gated power supply control means responsive to end of dialing signaled by said third terminal plurality for disabling said gated power supply means.

11. A combination as in claim 9, wherein said gated power supply means control means includes bistable means, dial command means for setting said bistable means to a first state for enabling said gated power supply means, and means responsive to end of dial signaling from said third terminal plurality for switching said bistable means to its alternate stable state.

* * * * *